(12) United States Patent
Spinelli

(10) Patent No.: US 11,849,704 B2
(45) Date of Patent: Dec. 26, 2023

(54) TOYS FOR PETS, AND METHODS FOR MAKING AND USING TOYS FOR PETS

(71) Applicant: Louis Spinelli, Seattle, WA (US)

(72) Inventor: Louis Spinelli, Seattle, WA (US)

( * ) Notice: Subject to any disclaimer, the term of this patent is extended or adjusted under 35 U.S.C. 154(b) by 0 days.

(21) Appl. No.: 17/525,867

(22) Filed: Nov. 13, 2021

(65) Prior Publication Data

US 2022/0071173 A1    Mar. 10, 2022

Related U.S. Application Data

(63) Continuation of application No. 16/834,870, filed on Mar. 30, 2020, now Pat. No. 11,172,650, which is a continuation of application No. 15/626,805, filed on Jun. 19, 2017, now Pat. No. 10,602,718, which is a continuation of application No. 14/248,965, filed on Apr. 9, 2014, now Pat. No. 9,686,967.

(51) Int. Cl.
  *A01K 15/02* (2006.01)

(52) U.S. Cl.
  CPC .......... *A01K 15/025* (2013.01); *A01K 15/026* (2013.01)

(58) Field of Classification Search
  CPC .... A63H 2027/1016; A63H 2027/1025; A63H 2027/1033; A63H 2027/1091; A63H 3/06; A01K 15/025; A01K 15/026
  See application file for complete search history.

(56) References Cited

U.S. PATENT DOCUMENTS

| | | |
|---|---|---|
| 5,093,175 A | 3/1992 | Goto et al. |
| 5,240,720 A | 8/1993 | Axelrod |
| D350,629 S | 9/1994 | Scrani |
| 5,356,645 A | 10/1994 | Del Villar |
| 5,447,532 A | 9/1995 | Furuya |
| 5,595,142 A | 1/1997 | Chill |
| 5,673,653 A | 10/1997 | Sherrill |
| 5,750,196 A | 5/1998 | Welch |
| 5,827,565 A | 10/1998 | Axelrod |
| 5,832,877 A | 11/1998 | Markham |
| 5,904,118 A | 5/1999 | Markham |
| 5,947,061 A | 9/1999 | Markham et al. |

(Continued)

FOREIGN PATENT DOCUMENTS

| | | |
|---|---|---|
| CN | 203072619 U | 7/2013 |
| DE | 19732140 A1 | 1/1999 |

(Continued)

*Primary Examiner* — Kristen C Hayes
(74) *Attorney, Agent, or Firm* — Harness, Dickey & Pierce, P.L.C.

(57) ABSTRACT

A toy for a pet generally includes a housing defining an opening, and an insert configured to fit at least partly within the opening of the housing. The insert is expandable from a first configuration in which the insert is capable of freely moving into and/or out of the opening of the housing to a second configuration in which the insert is inhibited from moving out of the opening of the housing. In some aspects, the insert is configured to substantially fill the opening of the housing when in the second configuration. In some aspect, the housing may have multiple openings, each capable of receiving an insert. And, in some aspects, the insert is expandable from the first configuration to the second configuration by heating the insert or exposing the insert to microwave energy.

12 Claims, 12 Drawing Sheets

(56) References Cited

U.S. PATENT DOCUMENTS

| | | |
|---|---|---|
| 6,098,571 A | 8/2000 | Axelrod et al. |
| 6,129,053 A | 10/2000 | Markham et al. |
| D433,778 S | 11/2000 | Axelrod |
| 6,180,161 B1 | 1/2001 | Axelrod |
| 6,238,715 B1 | 5/2001 | Baikie |
| 6,283,063 B1 | 9/2001 | Zalevsky |
| 6,289,846 B1 | 9/2001 | Long |
| 6,546,896 B1 | 4/2003 | Markham |
| D494,735 S | 8/2004 | Dahl et al. |
| 6,981,471 B1 * | 1/2006 | Dubinins ............ A01K 15/026 119/710 |
| 7,278,374 B2 | 10/2007 | Mann |
| 7,410,662 B1 | 8/2008 | Tsengas |
| 7,600,488 B2 | 10/2009 | Mann |
| 7,851,001 B2 | 12/2010 | Axelrod |
| 8,087,387 B2 | 1/2012 | Gamble et al. |
| 8,225,747 B2 | 7/2012 | Markham et al. |
| 8,303,638 B2 | 11/2012 | Hojbjerg et al. |
| 8,413,611 B2 | 4/2013 | Axelrod |
| D694,986 S | 12/2013 | Endres et al. |
| 9,686,967 B2 | 6/2017 | Spinelli |
| 2002/0106968 A1 | 8/2002 | Herrenbruck |
| 2004/0126462 A1 | 7/2004 | Tepper et al. |
| 2005/0042339 A1 | 2/2005 | Axelrod |
| 2005/0071927 A1 * | 4/2005 | Hague ............... A01K 15/026 8/94.17 |
| 2007/0099539 A1 * | 5/2007 | Fullmer ................. A63H 3/06 446/369 |
| 2007/0227464 A1 * | 10/2007 | Axelrod ............. A01K 15/026 119/709 |
| 2007/0234965 A1 * | 10/2007 | Aguilar .............. A01K 15/026 119/61.5 |
| 2008/0314331 A1 | 12/2008 | DeGhionno |
| 2008/0314333 A1 | 12/2008 | Hurwitz |
| 2009/0280216 A1 | 11/2009 | Fumita |
| 2010/0095902 A1 | 4/2010 | Kuwa |
| 2010/0237526 A1 * | 9/2010 | Zhang ................. B29C 44/181 264/45.1 |
| 2011/0139087 A1 | 6/2011 | Lang et al. |
| 2011/0146586 A1 | 6/2011 | Turner |
| 2012/0240866 A1 | 9/2012 | Taylor |
| 2013/0000564 A1 | 1/2013 | Beckhart et al. |
| 2013/0008389 A1 | 1/2013 | Teconchuk et al. |
| 2015/0114309 A1 * | 4/2015 | Davison, III ........ A01K 15/026 119/709 |
| 2015/0289483 A1 | 10/2015 | Spinelli |

FOREIGN PATENT DOCUMENTS

| | | |
|---|---|---|
| EP | 1 103 189 B1 | 3/2004 |
| EP | 2 233 270 A1 | 9/2010 |
| WO | WO-2015/157452 A1 | 10/2015 |

* cited by examiner

TOYS FOR PETS, AND METHODS FOR MAKING AND USING TOYS FOR PETS

This application is a continuation of U.S. patent application Ser. No. 16/834,870, filed Mar. 30, 2020, which is a continuation of U.S. patent application Ser. No. 15/626,805 (now U.S. Pat. No. 10,602,718), filed Jun. 19, 2017, which is a continuation of U.S. patent application Ser. No. 14/248,965 (now U.S. Pat. No. 9,686,967), filed on Apr. 9, 2014. The entire disclosure of each of the above applications is incorporated herein by reference.

FIELD

The present disclosure generally relates to toys for pets, and to methods for making and using such toys.

BACKGROUND

This section provides background information related to the present disclosure which is not necessarily prior art.

Pet toys exist in various forms, and can be made from numerous different materials (e.g., edible materials, inedible materials, etc.).

SUMMARY

This section provides a general summary of the disclosure, and is not a comprehensive disclosure of its full scope or all of its features.

Exemplary embodiments of the present disclosure generally relate to toys. In one exemplary embodiment, a toy for a pet generally includes a housing defining an opening, and an insert configured to fit at least partly within the opening of the housing and then be expanded to substantially fill the opening.

In another exemplary embodiment, a toy for a pet generally includes a housing defining at least one opening, and an insert configured to fit at least partly within the at least one opening of the housing. The insert is expandable, when subjected to a catalyst, from a first configuration in which the insert is capable of freely moving into and/or out of the at least one opening of the housing to a second configuration in which the insert is inhibited from moving out of the at least one opening of the housing.

Exemplary embodiments of the present disclosure also generally relate to methods for making toys. In one exemplary embodiment, a method for making a toy for a pet generally includes expanding an insert within a housing of the toy, so that the insert is inhibited from moving out of the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
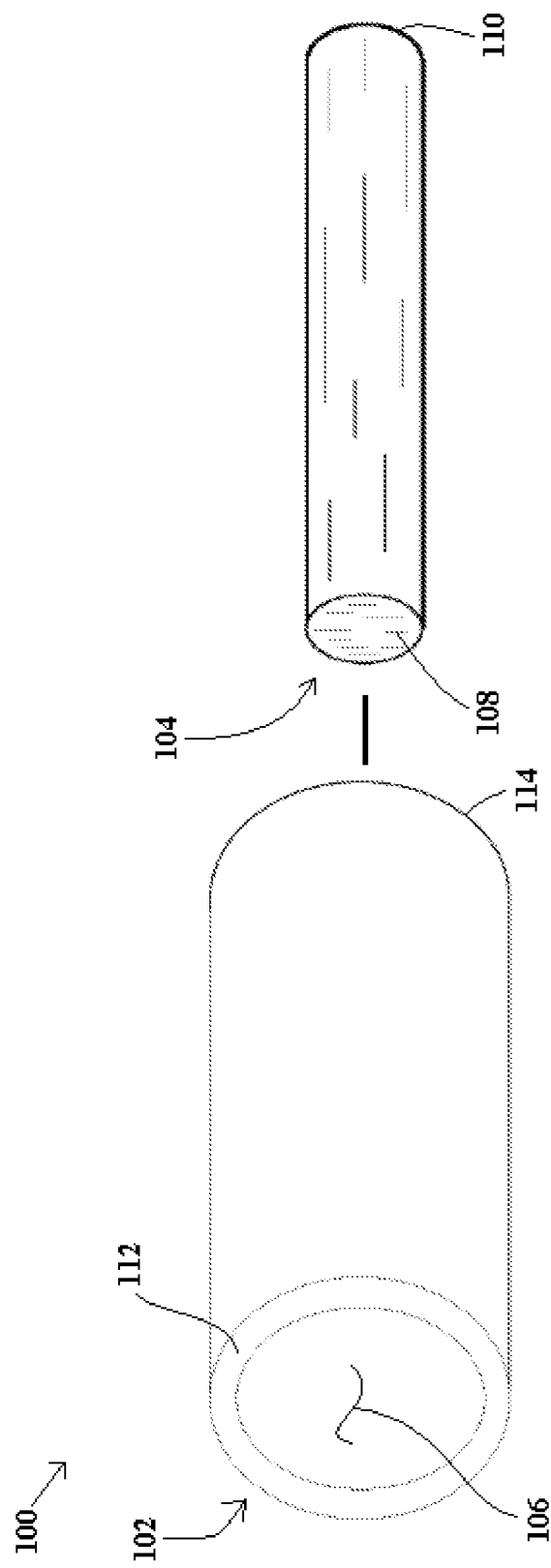
FIG. 1 is a perspective view of an exemplary embodiment of a pet toy according to the present disclosure.

The inventor hereof has developed, and discloses herein, exemplary embodiments of toys. In various aspects, the toys are for pets, where the pets can chew on and/or play with the toys as desired. But it should be appreciated that the toys may also be for animals other than pets within the scope of the present disclosure.

Exemplary embodiments of the toys generally include housings (e.g., outer portions, external portions, shells, covers, etc.) and inserts (e.g., inner portions, internal portions, etc.). The inserts are configured to fit at least partially within the housings, with the housings positioned at least partially around the inserts. And, the inserts are then configured to be expanded (e.g., upon addition of, application of, etc. catalysts; etc.) (e.g., from first configurations to second configurations, etc.), at least partially within the housings, to thereby fill (to various extents) interior portions of the housings with the inserts (e.g., mimicking marrow in bones, etc.). In so doing, the expanded inserts are securely coupled to, coupled with, retained in, inhibited from moving out of, etc. the housings (e.g., such that pets can then chew on and/or play with the toys, etc.).

In some aspects, the housings of the toys may define particular features (e.g., openings, etc.) for receiving the inserts. For example, the housings may define openings (e.g., channels, etc.) that extend completely through the housings (e.g., such that the housings generally have hollow interiors, etc.). Or, the housings may define openings (e.g., recesses, folds, cavities, etc.) that extend only partially into and/or through the housings (e.g., defining interior portions within the housings, etc.), or that interconnect with other openings defined by the housings (e.g., with other channels, other recesses, other folds, other cavities, etc.). The openings may be generally uniform in shape, or the openings may be generally non-uniform in shape. In addition, the housings may include any desired number of such features (e.g., one, two, more than two, etc.), or any combination of such features (e.g., various combinations of openings, recesses, folds, cavities, etc.). Further, interior portions of the features may include structures (e.g., textures, ribbings, grooves, crevasses, dimples, protrusions, bumps, ridges, etc.) and/or may include applications (e.g., adhesives, etc.) that additionally help couple, retain, hold, etc. (e.g., via friction, via adhesion, etc.) the inserts and the housings together, after the inserts are expanded in the housings (e.g., that help hold, couple, retain, etc. the inserts against, in contact with, etc. the interior portions of the housings, etc.).

The housings and/or the inserts of the toys can also define any suitable shapes within the scope of the present disclosure. For example, and without limitation, the housings may be shaped as cylinders, cups, bones, balls, tacos, other folded shapes, other uniform shapes, other non-uniform shapes, etc. And, the inserts may be shaped, without limitation, as sticks, rods, pellets, other uniform shapes, other non-uniform shapes, etc. In addition, outer surfaces of the housings and/or the inserts may be smooth or, alternatively, they may be textured (e.g., may include ribbings, grooves, dimples, protrusions, bumps, etc.) to help pets or other animals grasp the housings and/or inserts during use. Further, the housings and/or the inserts may be generally rigid in structure or they may be soft, as desired (e.g., depending on desired materials used to form the housings and/or the inserts, etc.).

In addition, the housings and/or the inserts of the toys can be constructed from any suitable materials or combination of materials within the scope of the present disclosure. For example, the housings and/or the inserts may be constructed from (without limitation) inedible materials that include natural bone, molded rubber, synthetic rubber, natural rubber, polymeric resins, other elastomeric materials, tire sidewalls, Kevlar®, Teflon®, other polymers, other suitable inedible materials, combinations thereof, etc. and/or edible materials that include solids from yak and/or cow milk, starch based expandable products, pelletized pork products, expanding foam products, rennet casein and gelatin, beaded corn starch and calcium carbonate, polyesteramide and starch, plasticized mixtures, paste/liquid/foams, jerky materials, rawhide materials, other edible substances, combinations thereof, etc. In various aspects, at the least, the inserts are formed from materials that are also expandable (e.g., due to release of gasses, due to other actions, etc.) upon addition of or exposure to suitable catalysts (e.g., heat, cold, fluid (e.g., water, etc.), leavening agents and acids, pressure and carbon dioxide, electric or wave energy, other physical and/or chemical reactants/agents, etc.). In addition, or alternatively, the housings may be formed from materials that contract and/or shrink upon addition of such catalysts, or from materials that deform, flex, etc. (e.g., resiliently, mechanically, etc.) when the inserts expand within the housings (e.g., as a result of the inserts applying forces on the housings and causing them to deform to accommodate the expanding inserts, etc.). As can be appreciated, the particular catalysts used to expand the inserts and/or contract (and/or shrink) the housings may depend on the materials used to form the inserts and/or the housings. Further, in some aspects, the inserts and/or housings may also have flavors and/or scents added thereto to improve their attraction to pets, and/or may be constructed from materials that are crunchy, moist, soft, mimic natural marrow, etc.

With reference now to the drawings, FIGS. 1-6 illustrate an exemplary embodiment of a toy 100 including one or more aspects of the present disclosure. Without limitation, the toy 100 is described herein as a pet toy 100, for use by pets where the pets can play with, chew on, etc. the toy 100. However, it should be appreciated that the toy 100 may also (or alternatively) be provided to and/or used by animals other than pets within the scope of the present disclosure.

Figure 2:
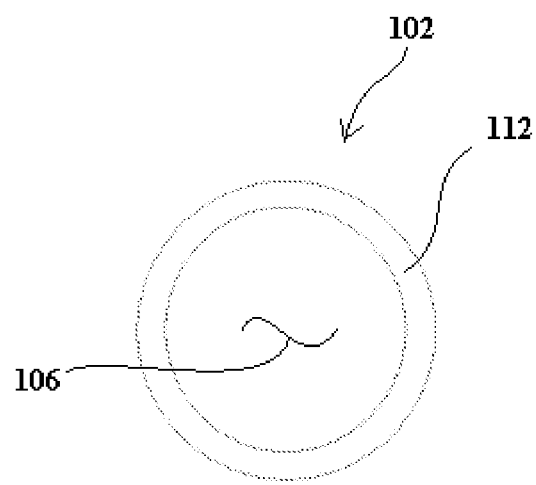
FIG. 2 is a side view of a housing of the pet toy of FIG. 1.
Figure 3:
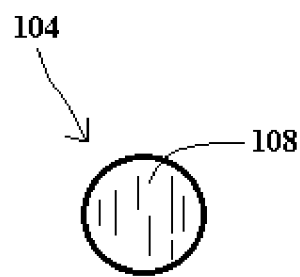
FIG. 3 is a side view of an insert of the pet toy of FIG. 1.

As shown in FIGS. 1-3, the illustrated pet toy 100 generally includes a housing 102, and an insert 104 configured to be positioned within the housing 102. The housing 102 defines a generally hollow cylinder shape, having an opening 106 (e.g., a cavity, a non-restrictive opening, etc.) extending completely through the housing 102. And, the insert 104 is generally rod shaped, having a generally elongate and tubular body. With that said, in other exemplary embodiments pet toys may include housings and/or inserts having other shapes, for example, preformed housings, housings that define bone shapes, ball shapes, etc. and/or inserts that define square shapes, rectangular shapes, pellet shapes, etc.

In the illustrated embodiment, the housing 102 of the pet toy 100 is formed from an inedible and durable elastomeric material (e.g., synthetic rubber, etc.), and the insert 104 is formed from an expandable and edible material (e.g., a combination of cow milk, salt, and lime juice; etc.). As such, the housing 102 generally provides a toy component for the pet to play with, and the insert 104 provides a treat component for the pet to eat as the pet plays with the toy 100. In addition, with this construction of the pet toy 100, the housing 102 is configured to outlast the insert 104 when the pet toy 100 is provided to the pet (such that the housing 102 is reusable). For example, when the insert 104 is consumed (or depleted) by the pet, another insert can be positioned in the housing 102, in the same manner as described herein for the insert 104, allowing for multiple refills of the housing 102 with inserts and continued/repeated use of the pet toy 100, before consumption or degradation of the reusable housing 102 occurs. With that said, the housing 102 and/or the insert 104 of the pet toy 100 may be formed from other materials within the scope of the present disclosure. For example, the housing 102 may be formed from other durable inedible materials such as (and without limitation) natural bone, polymeric resins, tire sidewalls, other elastomeric materials, Kevlar®, Teflon®, other polymers, combinations thereof, etc. And, the insert 104 may be formed from other expandable and edible materials such as (and without limitation) solids from yak and/or cow milk, starch based expandable products, pelletized pork products, expanding foam products, rennet casein and gelatin, beaded corn starch and calcium carbonate, polyesteramide and starch, plasticized mixtures, paste/liquid/foams, other edible substances, combinations thereof, etc.

Figure 4:
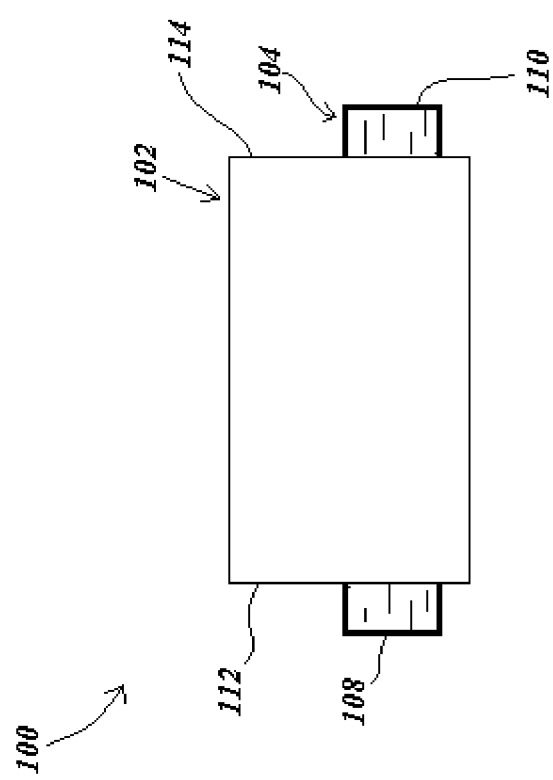
FIG. 4 is a side view of the pet toy of FIG. 1, with the insert shown positioned generally within an interior portion of the housing.
Figure 5:
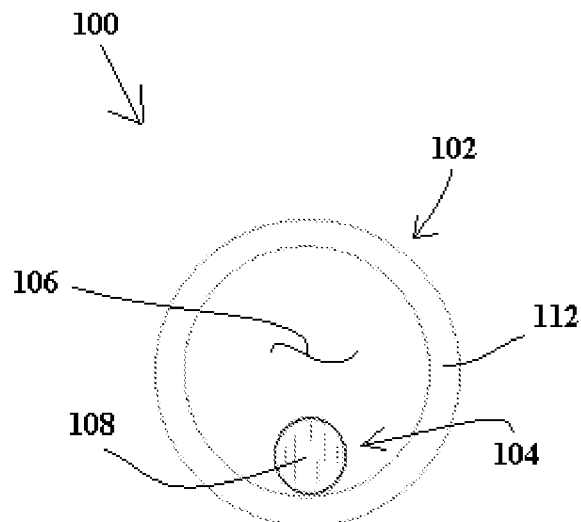
FIG. 5 is another side view of the pet toy of FIG. 1, with the insert shown positioned generally within the interior portion of the housing.
Figure 6:
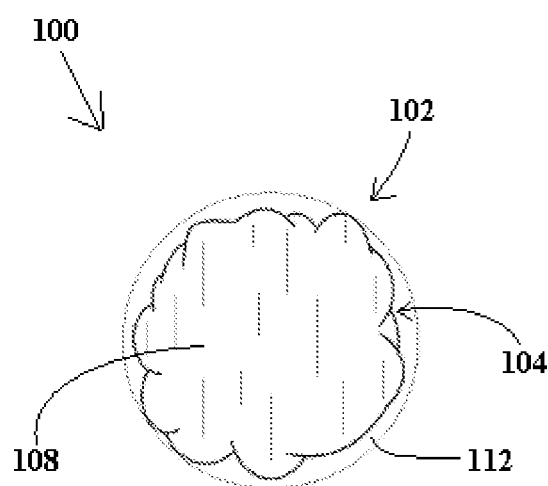
FIG. 6 is the side view of FIG. 4, with the insert shown expanded and generally filling the interior portion of the housing.

With additional reference now to FIGS. 4-6, the insert 104 of the pet toy 100 is configured to be positioned within the opening 106 of the housing 102, and then expanded (via a catalyst) to couple the insert 104 and the housing 102 together. For example, the insert 104 is initially placed in the opening 106 of the housing 102 before being expanded (FIGS. 4 and 5). And the toy 100, with the insert 104 placed in the opening 106 of the housing 102, is then heated or exposed to microwave energy (e.g., using a microwave, etc.) to expand the insert 104 within the housing's opening 106 (e.g., via release of gasses within the insert 104, via other actions occurring in the insert 104, etc.). In various aspects, the insert 104, when not expanded, may be viewed as a first configuration of the insert 104, and then the insert 104, when expanded, may be viewed as a second configuration of the insert 104.

In the illustrated embodiment, a cross section of the insert 104 is generally smaller than a corresponding cross section of the housing's opening 106 (FIG. 4) to allow the insert 104, before being expanded, to easily fit within the opening 106 (e.g., to freely move into and/or out of the opening 106, etc.) without interference (e.g., a cross-sectional area of the insert 104 may be about 10% smaller, about 20% smaller, about 30% smaller, about 40% smaller, about 50% smaller, about 75% smaller, other amounts smaller, etc. than a corresponding cross-sectional area of the housing's opening 106). And, a length of the insert 104 is generally greater than a corresponding length of the housing 102, such that end portions 108, 110 of the insert 104 extend out of the housing 102 through the opening 106 (FIG. 5) (e.g., to help facilitate positioning of the unexpanded insert 104 in the housing's opening 106, to help facilitate retaining the expanded insert 104 in the housing's opening 106, etc.). After expansion, the insert 104 substantially fills the housing's opening 106 (and is inhibited from moving out of the housing 102) and the end portions 108, 110 of the insert 104 expand generally around at least part of end portions 112, 114 of the housing 102 (FIG. 6), which helps seat, secure, retain, provide a generally tight fitting of, inhibit movement of, etc. the insert 104 in the housing 102. In addition, the end portions 108, 110 of the expanded insert 104, extending out of the housing 102, are readily accessible to the pet as the pet plays with the toy 100 (e.g., for the pet to eat, for the pet to dig out of the housing 102, etc.). In some aspects, this fit between the insert 104 and the housing 102 can also help regulate access to, consumption of, etc. the insert 104 by the pet (e.g., the generally tight fit between the insert 104 and the housing 102 inhibits the pet from simply pulling the insert 104 out of the housing 102, etc.).

As described above, the insert 104 of the illustrated pet toy 100 is constructed from edible material (e.g., a combination of cow milk, salt, and lime juice; etc.) that expands when heated or when microwave energy is applied thereto. In other exemplary embodiments, the insert 104 may be constructed from other materials that expand when exposed to other catalysts. In addition (or alternatively), the housing 102 of the pet toy 100 may be constructed from other materials that generally contract and/or shrink when exposed to the catalysts, and/or that resiliently deform when accommodating the expanding insert 104.

The housing 102 and/or the insert 104 of the pet toy 100 can be provided in any suitable size. For example, in the illustrated embodiment, the housing 102 is sized (e.g., includes a diameter, etc.) so as to generally fit within a mouth of a medium-sized dog. And, the insert 104 is sized so as to fit within the opening 106 of the housing 102 (e.g., so as to move freely into and out of the opening 106 without interference, etc.) before being expanded, and to generally fill the opening 106 of the housing 102 after being expanded. However, a size of the housing 102 can be changed, as desired, so that the pet toy 100 can be used by animals having larger or smaller sized mouths. In addition, a size of the insert 104 can be changed as needed to ensure proper fitting in the housing's opening 106, both before being expanded and after being expanded. Factors affecting the size of the insert 104 may include (without limitation) a size of the housing 102, a size of the opening 106 of the housing 102, a density and/or moisture content of the housing 102 and/or the insert 104, the materials used to construct the housing 102 and/or the insert 104, various other properties of the housing 102 and/or the insert 104 that may affect amounts of expansion and/or contraction, etc.

Figure 7:
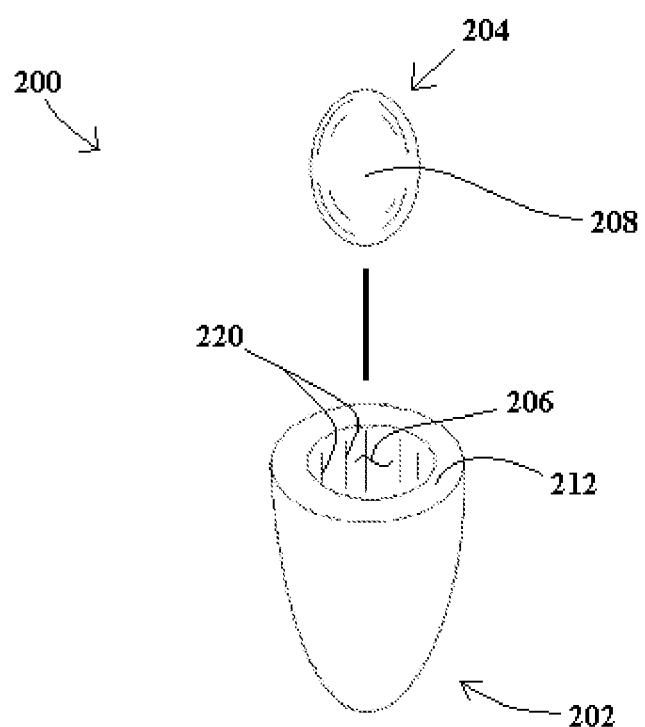
FIG. 7 is a perspective view of another exemplary embodiment of a pet toy according to the present disclosure.
Figure 8:
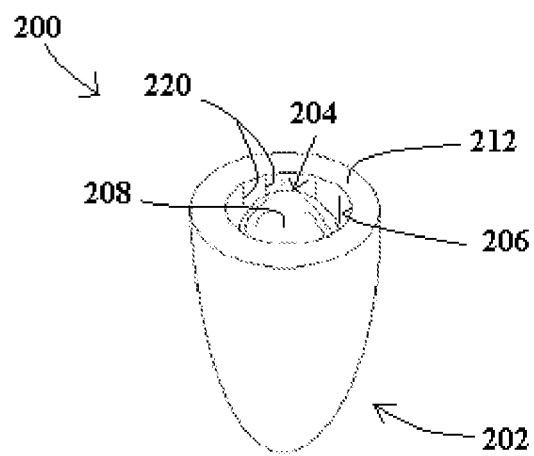
FIG. 8 is the perspective view of FIG. 7, with an insert of the pet toy shown positioned generally within an interior portion of a housing of the pet toy.
Figure 9:
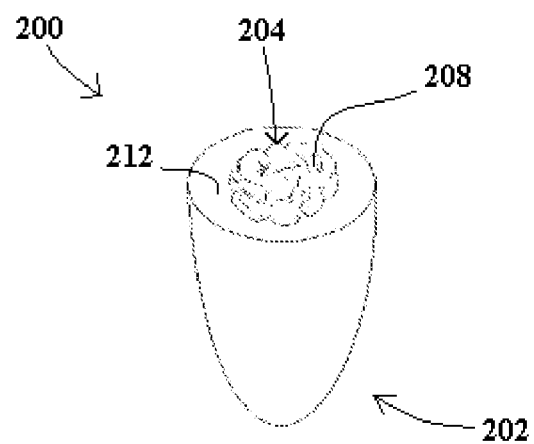
FIG. 9 is the perspective view of FIG. 8, with the insert shown expanded and generally filling the interior portion of the housing.

FIGS. 7-9 illustrate another exemplary embodiment of a toy 200 including one or more aspects of the present disclosure. Again without limitation, the toy 200 is described herein as a pet toy 200, for use by pets where the pets can play with, chew on, etc. the toy 200. However, it should be appreciated that the toy 200 may also (or alternatively) be provided to and/or used by animals other than pets within the scope of the present disclosure.

The pet toy 200 of this embodiment is similar to the pet toy 100 previously described and illustrated n FIGS. 1-6. For example, the pet toy 200 generally includes a housing 202, and an insert 204 configured to be positioned within the housing 202. The insert 204 is then also configured to be expanded (using suitable catalysts) within the housing 202 to couple the insert 204 and the housing 202 together. In this embodiment, the housing 202 defines a generally bowl shape having an opening 206 (e.g., a recess, a restrictive opening, etc.) extending therein. The opening 206 extends only partially into the housing 202, and does not extend completely through the housing 202 (although in other exemplary embodiments, the opening 206 may extend completely through the housing 202). And, the insert 204 is generally oval shaped (e.g., defining a pellet, etc.), and configured to fit at least partially within the opening 206 of the housing 202 (e.g., the insert 204, before being expanded, is generally smaller than the opening 206 of the housing 202 so that the insert 204 can be positioned within (e.g., is free to move into and out of, etc.) the opening 206 without interference from the housing 202, etc.). In other exemplary embodiments, pet toys may include housings and/or inserts having other shapes, for example, preformed housings, housings that define bone shapes, ball shapes, taco shapes, other folded shapes, etc. and/or inserts that define square shapes, rectangular shapes, pellet shapes, other shapes, etc.

The housing 202 of the illustrated pet toy 200 is again formed from an inedible and durable elastomeric material (e.g., rubber, etc.), and the insert 204 is formed from an expandable and edible material (e.g., a combination of cow milk, salt, and lime juice; etc.). As such, the housing 202 generally provides a toy component for the pet to play with, and the insert 204 provides a treat component for the pet to eat as the pet plays with the toy 200. Further, with this construction, the housing 202 is configured to outlast the insert 204 when the toy 200 is provided to the pet, such that when the insert 204 is consumed (or depleted) by the pet, another insert can be positioned in the housing 202 for continued use of the toy 200. With that said, it should again be appreciated that the housing 202 and/or the insert 204 may be formed from other suitable materials within the scope of the present disclosure, such as any of those described herein.

In the illustrated embodiment, the housing 202 of the pet toy 200 further includes ribs 220 provided along an interior surface of the housing's opening 206 (e.g., within an internal area of the opening 206, along sidewalls of the opening 206, etc.). The ribs 220 function to help increase retention of the insert 204 in the opening 206 after the insert 204 is expanded. In other exemplary embodiments, structure other than the ribs 220 may be included in the opening 206 of the housing 202 to help increase retention of the insert 204 therein (e.g., textures, grooves, crevasses, dimples, protrusions, bumps, ridges, etc.). In addition, or alternatively, additional materials such as adhesives, etc. may be applied to the interior surface of the housing's opening 206 to even further increase binding between the insert 204 and the housing 202.

As shown in FIGS. 8 and 9, the insert 204 of the pet toy 200 is configured to be positioned within the opening 206 of the housing 202, and then expanded (via a catalyst) to couple the insert 204 and housing 202 together. For example, the insert 204 is initially placed in the opening 206 of housing 202 before being expanded (FIG. 8). And the toy 200, with the insert 204 placed in the opening 206 of the housing 202, is then heated or exposed to microwave energy (e.g., using a microwave, etc.) to expand the insert 204 within the housing's opening 206 (e.g., via release of gasses within the insert 204, via other actions occurring in the insert 204, etc.). In the illustrated embodiment, a cross section of the insert 204 is generally smaller than a corresponding cross section of the housing's opening 206 to allow the insert 204, before being expanded, to easily fit within the opening 206 (e.g., to freely move into and/or out of the opening 206, etc.) without interference from the housing 202 (e.g., a cross-sectional area of the insert 204 is generally smaller than a corresponding cross-sectional area of the opening 206 of the housing 202, etc.). After expansion, the insert 204 substantially fills the housing's opening 206 (FIG. 9), expanding generally around the ribs 220 which helps seat, secure, retain, etc. the insert 204 in the housing 202 (and helps inhibit the insert 204 from moving out of the housing 202). And, while not required, an end portion 208 of the insert 204, which expands generally around at least part of an end portion 212 of the housing 202, extends partially out of the housing's opening 206 and is readily accessible to the pet as the pet plays with the toy 200 (e.g., for consumption, etc.).

Figure 10:
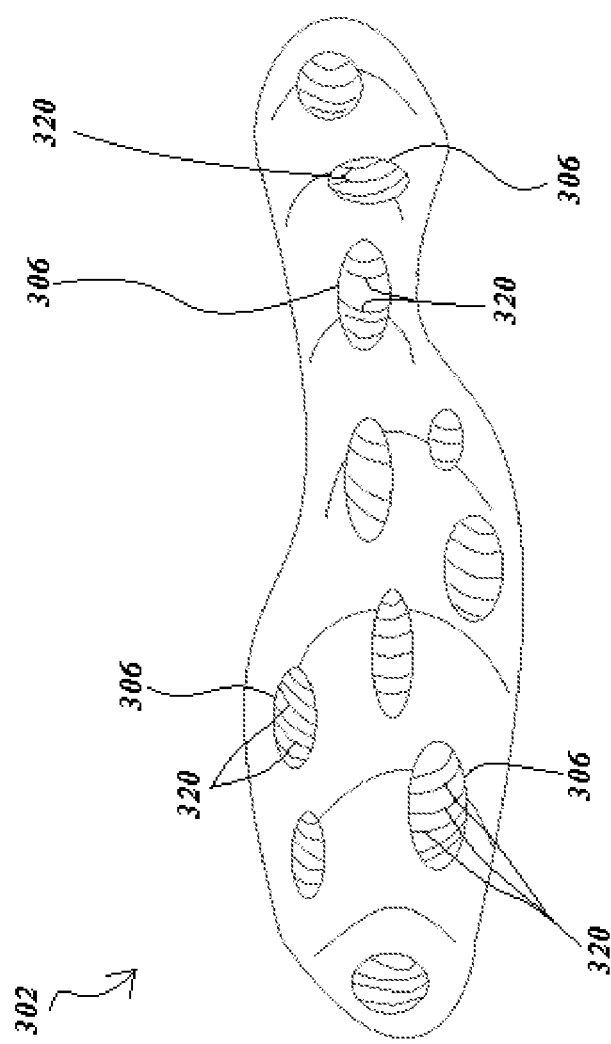
FIG. 10 is a perspective view of an exemplary embodiment of a housing suitable for use with pet toys of the present disclosure.

FIG. 10 illustrates an exemplary embodiment of a housing 302 suitable for use with pet toys of the present disclosure (e.g., pet toy 100, pet toy 200, pet toy 500, etc.). The illustrated housing 302 is generally elongate and irregular (and complex) in shape. And, multiple openings 306 (e.g., recesses, folds, etc.) are defined in the housing 302 for receiving inserts therein (e.g., the insert 104, the inert 204, the insert 404, the inserts 504, other inserts, etc.). In the illustrated embodiment, at least some of the openings 306 are non-uniform in shape (e.g., include interior portions that define non-uniform shapes, etc.). In addition, the openings 306 extend only partially into the housing 302, and do not extend completely through the housing 302 (although in other exemplary embodiments, one or more of the openings 306 may extend completely through the housing 302). Further, ribs 320 are provided along interior surfaces of the housing's openings 306 (e.g., within internal areas of the openings 306, along sidewalls of the openings 306, etc.) to help increase retention of the inserts in the openings 306 after the inserts are expanded. The illustrated housing 302 is again formed from an inedible and durable elastomeric material (e.g., rubber, etc.), but could be formed from other suitable materials within the scope of the present disclosure (e.g., any of the other materials described herein, etc.).

Any suitable insert(s) may be used with the housing 302, including any of the insets described herein, etc. For example, the insert 104 and/or the insert 404 may be used with the housing, where the inserts 104, 404 are initially broken into smaller portions (to accommodate the smaller openings 306 of the housing 302) which are then positioned within the openings 306 of the housing 302 (before being expanded). Alternatively, or in addition, the insert 204 and/or the inserts 504 may be used (as they may already be correspondingly sized to fit generally within the openings 306 of the housing 302, before being expanded). With that said, it should be appreciated that the insert(s) used with the housing 302 can generally have any suitable size and/or shape, as long as the insert(s) are able to fit generally within the openings 306 of the housing 302 before being expanded. The expanding nature/quality of the insert(s) then allows the insert(s) to substantially fill the openings 306 (regardless of the shape of the openings 306).

In some exemplary embodiments, the housing 302 may further include a cavity, channel, etc. defined in the housing 302 and interconnected with one or more of the openings 306. Here, for example, additional treats, etc. may be positioned within the cavity, and then inserts may be positioned within the openings 306. As a pet consumes (or depletes) the inserts, the additional treats in the cavity then become accessible. Alternatively, a single insert may be positioned initially within the cavity where, upon expansion, the single insert then generally fills the cavity and each of the openings 306.

Figure 11:
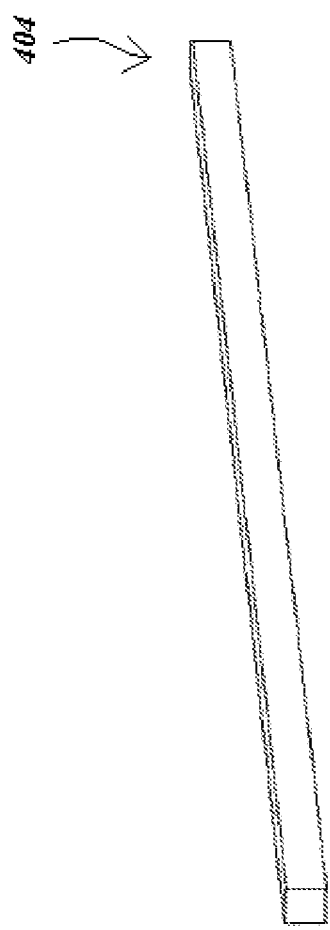
FIG. 11 is a perspective view of an exemplary embodiment of an insert suitable for use with pet toys of the present disclosure.

FIG. 11 illustrates an exemplary embodiment of an insert 404 suitable for use with pet toys of the present disclosure (e.g., pet toy 100, pet toy 200, pet toy 500, etc.). The insert 404 is elongate in shape and defines a generally square cross-section. And, the insert 404 is constructed from edible material (e.g., a combination of cow milk, salt, and lime juice; etc.) that expands with heated or when exposed to microwave energy. As such, the insert 404 can be positioned in opening(s) of a housing and expanded, as described herein. For example, the insert 404 can be positioned within the opening 106 of the housing 102 and then expanded to couple the insert 404 and the housing 102 together. Or, portions of the insert 404 could be broken-off and used with the housing 202, the housing 302, or the housing 502. In other exemplary embodiments, the insert 404 may define other shapes having other cross sections, for example, other cuboid shapes, elongate shapes that define generally rectangular cross-sections, etc.

Figure 12:
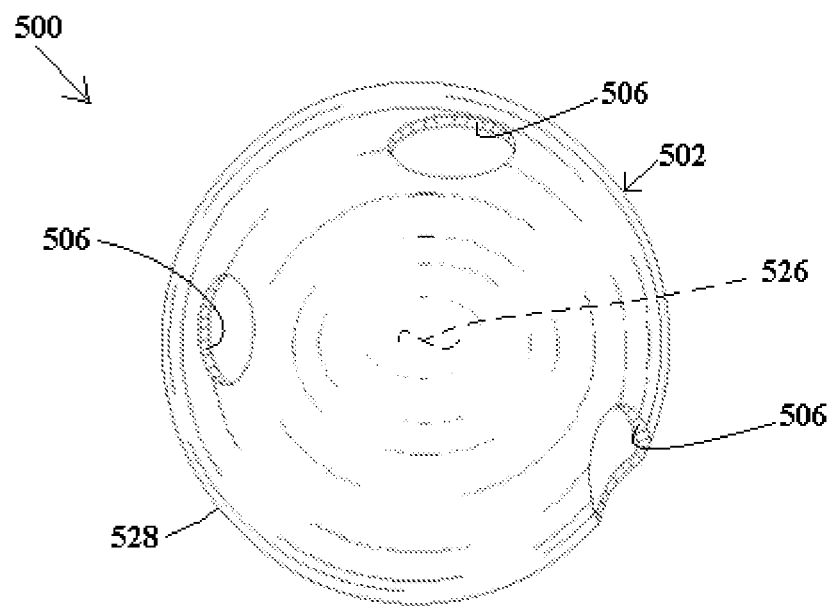
FIG. 12 is a perspective view of another exemplary embodiment of a pet toy according to the present disclosure.
Figure 13:
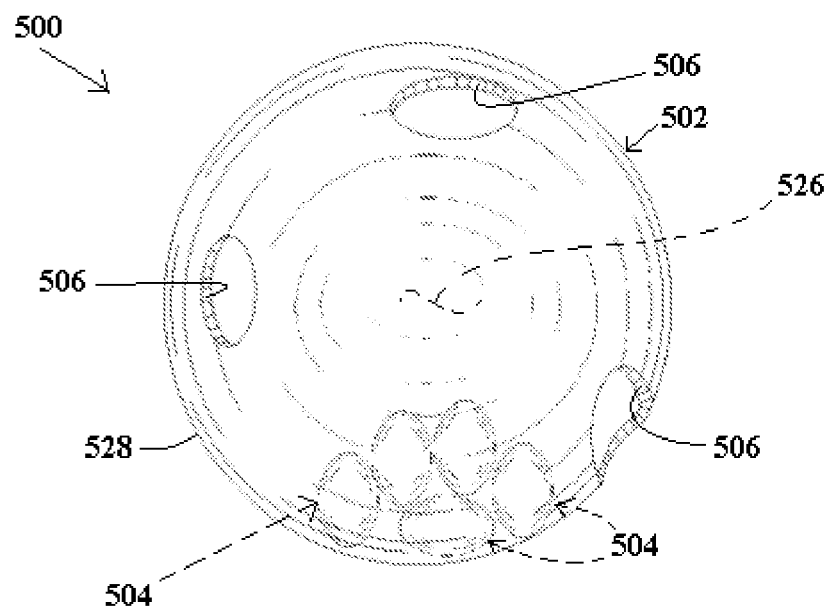
FIG. 13 is the perspective view of FIG. 12, with inserts of the pet toy shown positioned generally within an interior portion of a housing of the pet toy.
Figure 14:
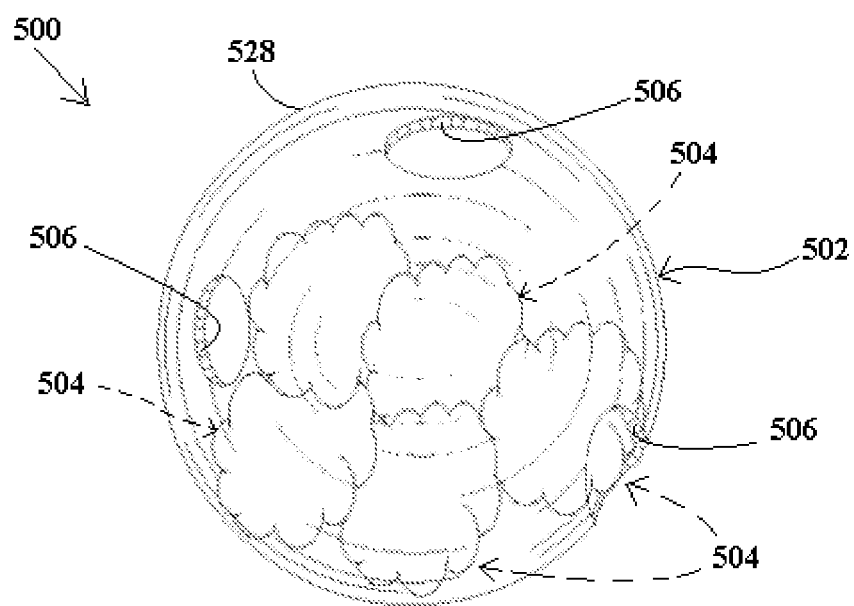
FIG. 14 is the perspective view of FIG. 13, with the inserts shown expanded within the interior portion of the housing.

FIGS. 12-14 illustrate another exemplary embodiment of a toy 500 including one or more aspects of the present disclosure. Again without limitation, the toy 500 is described herein as a pet toy 500, for use by pets where the pets can play with, chew on, etc. the toy 500. However, it should be appreciated that the toy 500 may also (or alternatively) be provided to and/or used by animals other than pets within the scope of the present disclosure.

The pet toy 500 of this embodiment generally includes a housing 502, and multiple inserts 504 configured to be positioned within the housing 502. As described herein, the inserts 504 are then configured to be expanded (using suitable catalysts) within the housing 502 to secure, retain, etc. the inserts 504 within the housing 502. In this embodiment, the housing 502 is shaped as a generally hollow ball, having a cavity 526 (broadly, and opening) defined therein and multiple openings 506 defined in a wall portion 528 of the housing 502 (and in communication with the cavity 526). And, the inserts 504 are each generally oval in shape (e.g., defining a pellet, etc.), and are each sized to fit though the openings 506 of the housing 502 for positioning within the cavity 526 (before being expanded). With that said, in other exemplary embodiments, pet toys may include housings and/or inserts having other shapes, for example, preformed housings, housings that define bone shapes, ball shapes, etc. and/or inserts that define square shapes, rectangular shapes, pellet shapes, etc.

Also in this embodiment, the housing 502 is again formed from an inedible and durable elastomeric material (e.g., rubber, etc.), and the inserts 504 are formed from an expandable and edible material (e.g., a combination of cow milk, salt, and lime juice; etc.). As such, the housing 502 generally provides a toy component for the pet to play with, and the inserts 504 provide a treat component for the pet to eat as the pet plays with the toy 500. Further, with this construction, the housing 502 is configured to outlast the inserts 504 when the toy 500 is provided to the pet, such that when the inserts 504 are consumed (or depleted) by the pet, additional inserts can be positioned in the housing 502 for continued use of the toy 500. In addition, the illustrated housing 502 is also generally transparent, such that the inserts 504 can be viewed through the wall portion 528 of the housing. It should again be appreciated that the housing 502 and/or the inserts 504 may be formed from other suitable materials within the scope of the present disclosure, such as any of those described herein.

As shown in FIGS. 13 and 14, the inserts 504 of the pet toy 500 are configured to be positioned within the cavity 526 of the housing 502 (via one or more of the openings 506), and then expanded (via a catalyst). For example, the inserts 504 are initially placed in the cavity 526 of the housing 502 before being expanded (FIG. 13). The toy 500, with the inserts 504 placed in the cavity 526 of the housing 502, is then heated or exposed to microwave energy (e.g., using a microwave, etc.) to expand the inserts 504 within the cavity 526 (e.g., via release of gasses within the inserts 504, via other actions occurring in the inserts 504, etc.). A cross section of each of the inserts 504, before being expanded, is generally smaller than a corresponding cross section of the housing's openings 506 to allow the inserts 504 to easily fit through the openings 506 and into the cavity 526 (e.g., to freely move into and/or out of the openings 506 and/or the cavity 526, etc.) without interference. The expanded inserts 504 are then generally smaller in size than the cavity 526 of the housing 502 and thus are free to move around the cavity 526 (FIG. 14). However, the expanded inserts 504 are generally larger in size than the openings 506 of the housing 502 and are inhibited from exiting the housing 502 through the openings 506 (FIG. 14).

In this embodiment, additional treats, etc. may also be positioned within the cavity 526 of the housing 502. Here, the expanded inserts 504 may initially tend to block the treats from exiting the housing 502 through the openings 506. However, as a pet consumes (or depletes) the inserts 504 (which are accessible through the openings 506), the additional treats in the cavity 526 may then also then become accessible through the openings 506 (such that the pet toy 500 also operates as a metering device for the additional treats).

Figure 15:
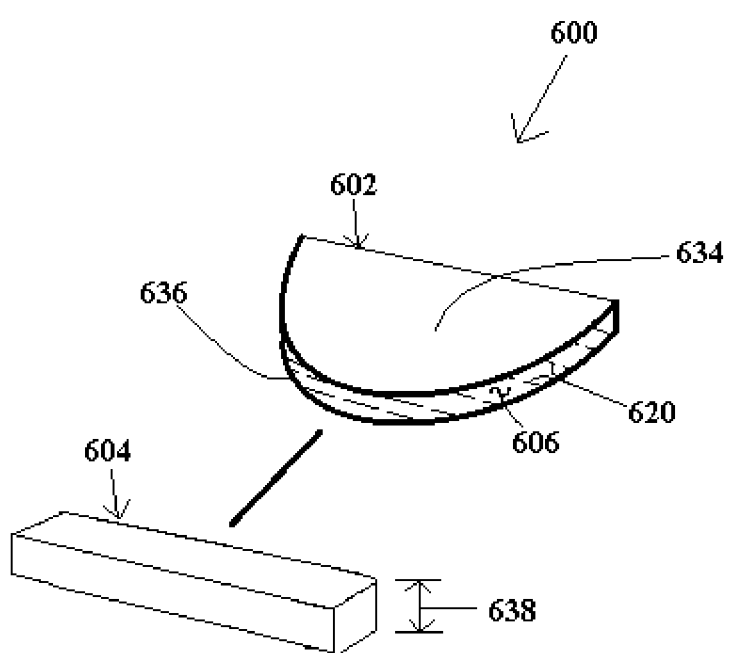
FIG. 15 is a perspective view of another exemplary embodiment of a pet toy according to the present disclosure.
Figure 16:
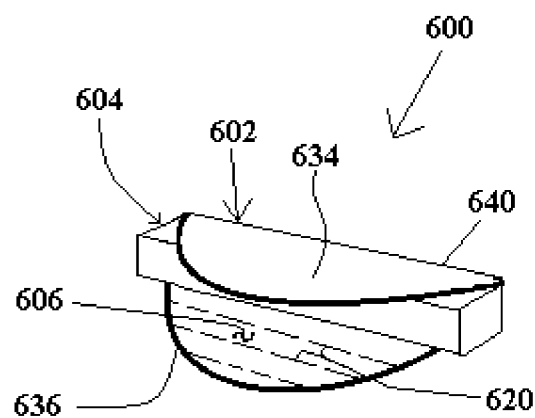
FIG. 16 is the perspective view of FIG. 15, with an insert of the pet toy shown positioned generally within an opening of a housing of the pet toy.
Figure 17:
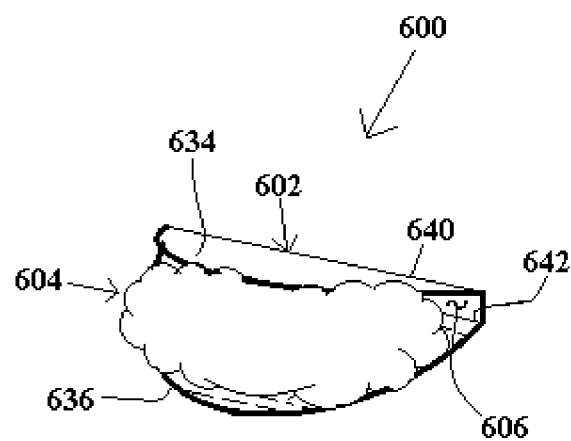
FIG. 17 is the perspective view of FIG. 16, with the insert shown expanded and generally filling the opening of the housing.

FIGS. 15-17 illustrate another exemplary embodiment of a toy 600 including one or more aspects of the present disclosure. Again without limitation, the toy 600 is described herein as a pet toy 600, for use by pets where the pets can play with, chew on, etc. the toy 600. However, it should be appreciated that the toy 600 may also (or alternatively) be provided to and/or used by animals other than pets within the scope of the present disclosure.

The pet toy 600 of this embodiment is similar to the pet toy 100 previously described and illustrated in FIGS. 1-6. For example, the pet toy 600 generally includes a housing 602, and an insert 604 configured to be positioned within the housing 602. The insert 604 is then also configured to be expanded (using suitable catalysts) within the housing 602 to generally couple the insert 604 and the housing 602 together. In this embodiment, the housing 602 defines a generally taco shape (e.g., a generally folded shape, etc.) having an opening 606 (e.g., a spacing, etc.) extending there through generally between sides 634, 636 of the housing 602. The opening 606 extends generally completely through the illustrated housing 602 although, in other exemplary embodiments, the opening 606 may extend only partially through the housing 602. And, the insert 604 is generally elongate in shape and defines a generally square cross-section, and is configured to fit at least partially within the opening 606 of the housing 602 between the sides 634, 636.

The housing 602 of the illustrated pet toy 600 is again formed from an inedible and durable elastomeric material (e.g., synthetic rubber, etc.), and the insert 604 is formed from an expandable and edible material (e.g., a combination of cow milk, salt, and lime juice; etc.). As such, the housing 602 generally provides a toy component for the pet to play with, and the insert 604 provides a treat component for the pet to eat as the pet plays with the toy 600. Further, with this construction, the housing 602 is configured to outlast the insert 604 when the toy 600 is provided to the pet, such that when the insert 604 is consumed (or depleted) by the pet, another insert can be positioned in the housing 602 for continued use of the toy 600. With that said, it should again be appreciated that the housing 602 and/or the insert 604 may be formed from other suitable materials within the scope of the present disclosure, such as any of those described herein.

In the illustrated embodiment, the housing 602 of the pet toy 600 also includes ribs 620 provided along an interior surface of the housing's opening 606 (e.g., within an internal area of the opening 606, along the sides 634, 636 of the opening 606, etc.). The ribs 620 function to help increase retention of the insert 604 in the opening 606 after the insert 604 is expanded. In other exemplary embodiments, structure other than the ribs 620 may be included in the opening 606 of the housing 602 to help increase retention of the insert 604 therein (e.g., textures, grooves, crevasses, dimples, protrusions, bumps, ridges, etc.). In addition, or alternatively, other materials such as adhesives, etc. may be applied to the interior surface of the housing's opening 606 to even further increase binding between the insert 604 and the housing 602.

As shown in FIGS. 16 and 17, the insert 604 of the pet toy 600 is configured to be positioned within the opening 606 of the housing 602 between the sides 634, 636, and then expanded (via a catalyst) to generally couple the insert 604 and housing 602 together. For example, the insert 604 is initially placed in the opening 606 of housing 602 before being expanded (FIG. 16). And the toy 600, with the insert 604 placed in the opening 606 of the housing 602, is then heated or exposed to microwave energy (e.g., using a microwave, etc.) to expand the insert 604 within the housing's opening 606 (e.g., via release of gasses within the insert 604, via other actions occurring in the insert 604, etc.) (FIG. 17). The insert 604 is then selectively accessible to the pet, through the housing's opening 606, as the pet plays with the toy 600 (e.g., for consumption, etc.).

Also in the illustrated embodiment, the insert 604, before being expanded, is generally larger than the opening 606 of the housing 602 (e.g., a height dimension 638 of the insert 604 is generally larger than a spacing between the sides 634, 636 of the housing 602, a cross section of the insert 604 is generally larger than the spacing between the sides 634, 636 of the housing 602, etc.). To accommodate the insert 604, the housing 602 is therefore configured to resiliently deform, flex, etc. (e.g., the sides 634, 636 are configured to move apart, pivot, etc. generally along hinges 640, 642; etc.) so that the insert 604 can be positioned within the opening 606 and then expanded. After expansion, the insert 604 substantially fills the housing's opening 606, expanding generally outwardly and around the ribs 620 (which, together with inward forces from the sides 634, 636 of the resiliently flexed housing 602, helps seat, secure, retain, etc. the insert 604 in the housing 602 and inhibit the insert 604 from moving out of the housing 602). In addition, the resilient nature of the housing 602 facilitates reuse of the housing 602 when the insert 604 is depleted.

As can be seen, the toys of the present disclosure can include housings with single openings or multiple openings. And, because the mode of retention between the housings and the inserts is generally driven by expansion of the inserts, the inserts can be easily placed in the openings of the housings, before being expanded, and then securely retained in the housings after being expanded. As such, unlike other known pet toys, specific configurations of the openings and/or the inserts (and/or inclusion of additional structure over the openings) are not necessary to ensure that the inserts are retained within the housings. In addition, because of the expansion feature, shapes of the inserts do not need to closely match shapes of the openings of the housings in order to retain the inserts within the housings; the expanding quality, nature, etc. of the inserts will accommodate any differences in shapes, sizes, etc. between the inserts and the openings, as well as accommodate any irregular and/or complex shaped openings.

The toys of the present disclosure can also be easily formed, prepared, etc. by simply positioning the inserts into the openings of the housings, and then expanding the inserts (via catalysts) to form the final version of the toys. As can be seen, supports, forms, etc. are not required to support, hold, contain, etc. the inserts in the openings of the housing when expanding the inserts. Instead, the inserts can simply rest on portions of the housings (e.g., within the openings of the housings, etc.) when being expanded.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With that said, the foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for making a pet toy, the pet toy including a housing defining an opening having an interior surface, the method comprising:
    applying an adhesive to the interior surface of the opening of the housing;
    positioning an insert at least partly within the opening of the housing, wherein the adhesive facilitates binding between the insert and the interior surface of the opening; and
    expanding the insert within the opening of the housing, by heating the insert or exposing the insert to microwave energy, so that the insert is inhibited from moving out of the opening of the housing.

2. The method of claim 1, wherein expanding the insert includes expanding the insert within the opening of the housing, so that the insert substantially fills the opening of the housing.

3. The method of claim 2, wherein expanding the insert within the opening includes expanding the insert so that the insert is in contact with the interior surface of the opening.

4. The method of claim 2, wherein the insert is a first insert and the opening of the housing is a first opening, and wherein the housing further includes a second opening, the method further comprising:
    applying additional adhesive to an interior surface of the second opening;
    positioning a second insert at least partly within the second opening of the housing, wherein the additional adhesive facilitates binding between the second insert and the interior surface of the second opening; and
    expanding the second insert within the second opening of the housing, so that the second insert substantially fills the second opening of the housing.

5. The method of claim 2, wherein the opening includes an interior region that defines a non-uniform shape.

6. The method of claim 1, wherein the insert is constructed from an edible material.

7. A pet toy, comprising:
    a housing defining at least one opening; and
    an insert configured to fit at least partly within the at least one opening of the housing, wherein the insert is expandable, when heated or when exposed to microwave energy, from a first configuration in which the insert is capable of freely moving into and/or out of the at least one opening of the housing to a second configuration in which the insert is inhibited from moving out of the at least one opening;
    wherein an outer surface of the housing and/or an outer surface of the insert comprises a textured surface, and wherein the textured surface includes at least one of multiple ribbings, multiple grooves, multiple dimples, multiple protrusions and multiple bumps; and
    wherein the housing is constructed from a synthetic material and the insert is constructed from an edible material.

8. The pet toy of claim 7, wherein the outer surface of the housing comprises the textured surface.

9. The pet toy of claim 7, wherein the outer surface of the insert comprises the textured surface.

10. The pet toy of claim 7, wherein the at least one opening includes multiple openings.

11. The pet toy of claim 10, wherein the multiple openings are interconnected within the housing.

12. A pet toy, comprising:
    a housing defining multiple openings interconnected within the housing; and
    an insert configured to fit at least partly within at least one of the multiple openings of the housing, wherein the insert is expandable, when heated or when exposed to microwave energy, from a first configuration in which the insert is capable of freely moving into and/or out of the at least one of the multiple openings of the housing to a second configuration in which the insert is inhibited from moving out of the at least one of the multiple openings;
    wherein an outer surface of the housing and/or an outer surface of the insert comprises a textured surface, and wherein the textured surface includes at least one of multiple ribbings, multiple grooves, multiple dimples, multiple protrusions and multiple bumps.

\* \* \* \* \*